US009575348B2

(12) United States Patent
Park et al.

(10) Patent No.: US 9,575,348 B2
(45) Date of Patent: Feb. 21, 2017

(54) DISPLAY SUBSTRATE AND DISPLAY PANEL HAVING THE SAME

(71) Applicant: Samsung Display Co., Ltd., Yongin, Gyeonggi-do (KR)

(72) Inventors: Joonyong Park, Gunpo-si (KR); Hyungjune Kim, Anyang-si (KR); YeoGeon Yoon, Suwon-si (KR); Kyungseop Kim, Hwaseong-si (KR); Sangwon Shin, Yongin-si (KR); Sangwook Lee, Busan (KR); Changoh Jeong, Suwon-si (KR); Hyun-Ho Kang, Ansan-si (KR); Taehyung Kim, Anyang-si (KR); Taekyung Yim, Seoul (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 381 days.

(21) Appl. No.: 14/338,066

(22) Filed: Jul. 22, 2014

(65) Prior Publication Data
US 2015/0085229 A1    Mar. 26, 2015

(30) Foreign Application Priority Data

Sep. 24, 2013    (KR) ......................... 10-2013-0113422

(51) Int. Cl.
*G02F 1/1335*    (2006.01)
*G02F 1/1333*    (2006.01)

(52) U.S. Cl.
CPC .. *G02F 1/133345* (2013.01); *G02F 1/133502* (2013.01); *G02F 2001/133565* (2013.01)

(58) Field of Classification Search
CPC ........... G02F 1/13363; G02F 1/133634; G02F 2001/133565; G02F 1/133345; G02F 1/133502

(Continued)

(56) References Cited

U.S. PATENT DOCUMENTS 5,902,702 A    5/1999   Nakao et al.
6,184,946 B1   2/2001   Ando et al.
(Continued)

FOREIGN PATENT DOCUMENTS

JP           2000-77677 A      3/2000
KR      10-2000-0014536 A      3/2000
(Continued)

OTHER PUBLICATIONS

Zou et al., "Influence of Multiple Reflection and Optical Interference on the Magneto-optical Properties of Co-Pt Alloy Films Investigated by using the Characteristic Matrix Method," *Journal of the Korean Physical Society*, vol. 36, No. 5, May 2000, pp. 304-310.

*Primary Examiner* — Nathanael R Briggs
*Assistant Examiner* — William Peterson
(74) *Attorney, Agent, or Firm* — Knobbe, Martens, Olson & Bear, LLP

(57) ABSTRACT

A display substrate is disclosed. In one aspect, the display substrate includes a base substrate having a first refractive index and receiving external light and an insulating layer disposed below the base substrate and having a second refractive index different from the first refractive index. The display substrate also includes a pixel electrode disposed below the first insulating layer and a first compensation layer forming an interface with the insulating layer and having a third refractive index greater than the first refractive index and less than the second refractive index. The first compensation layer is disposed between the first insulating layer and the base substrate.

20 Claims, 10 Drawing Sheets

(58) Field of Classification Search
USPC .......................................................... 349/119
See application file for complete search history.

(56) References Cited

U.S. PATENT DOCUMENTS

| | | | |
|---|---|---|---|
| 7,330,226 B2 * | 2/2008 | Kim | .................. G02F 1/133514 |
| | | | 349/106 |
| 7,477,345 B2 | 1/2009 | Kim et al. | |
| 2004/0021805 A1 | 2/2004 | Nagata et al. | |
| 2004/0246424 A1 | 12/2004 | Sawasaki et al. | |
| 2010/0001346 A1 | 1/2010 | Ye | |
| 2013/0120846 A1 | 5/2013 | Dai et al. | |
| 2013/0122712 A1 | 5/2013 | Kim et al. | |
| 2013/0141688 A1 | 6/2013 | Wang | |
| 2013/0285938 A1 * | 10/2013 | Kang | ...................... G06F 3/041 |
| | | | 345/173 |

FOREIGN PATENT DOCUMENTS

| | | |
|---|---|---|
| KR | 10-2000-0044858 A | 7/2000 |
| KR | 10-2001-0002111 A | 1/2001 |
| KR | 10-2004-0005040 A | 1/2004 |
| KR | 10-0529383 B1 | 11/2005 |
| KR | 10-2006-0023696 A | 3/2006 |
| KR | 10-2007-0106278 A | 11/2007 |
| KR | 10-2008-0032313 A | 4/2008 |
| KR | 10-1100681 B1 | 12/2011 |

* cited by examiner

DISPLAY SUBSTRATE AND DISPLAY PANEL HAVING THE SAME

CROSS-REFERENCE TO RELATED APPLICATIONS

This U.S. non-provisional patent application claims priority under 35 U.S.C. §119 of Korean Patent Application No. 10-2013-0113422, filed on Sep. 24, 2013, the contents of which are hereby incorporated by reference in its entirety.

BACKGROUND

Field

The described technology generally relates to a display substrate and a display panel having the same.

Description of the Related Technology

Flat panel displays have essentially replaced cathode ray tube displays since flat panel displays are comparatively thin and consume less power. Numerous varieties of flat panel displays have been developed, such as organic light-emitting diode (OLED) displays, liquid crystal displays (LCDs), plasma displays, etc.

The standard flat panel display includes pixels and signal lines that apply signals to the pixels. Each pixel includes a thin film transistor connected to a corresponding signal line. Each pixel is driven in response to a data voltage or current provided through the corresponding signal line in order to display a desired image on the flat panel display.

SUMMARY OF CERTAIN INVENTIVE ASPECTS

One inventive aspect is a display substrate having improved display quality and a display panel including the display substrate.

Another aspect is a display substrate capable of preventing a color distortion phenomenon caused by an insulating layer.

Another aspect is a display panel having the display substrate.

Another aspect is a display substrate including a base substrate that receives an external light incident to an upper portion thereof and has a first refractive index, a first insulating layer disposed under the base substrate and having a second refractive index different from the first refractive index, a pixel electrode disposed under the first insulating layer, and a first compensation layer disposed between the first insulating layer and the base substrate to form an interface with the first insulating layer and having a third refractive index greater than the first refractive index and less than the second refractive index. A portion of the external light is reflected by the interface and the reflected light from the interface has a reflective spectrum obtained by changing an inherent reflective spectrum of the first insulating layer.

The display substrate further includes a plurality of signal lines disposed between the base substrate and the first insulating layer and the first compensation layer is disposed between the base substrate and the signal lines.

The display substrate further includes a second compensation layer disposed between the first insulating layer and the pixel electrode and the second compensation layer has a refractive index between refractive indices of layers disposed adjacent to the second compensation layer.

The display substrate further includes a second insulating layer disposed between the first insulating layer and the pixel electrode to form an interface with the second compensation layer and the refractive index of the second compensation layer is greater than a refractive index of the second insulating layer and smaller than a refractive index of the pixel electrode.

The first insulating layer includes silicon nitride and the first compensation layer includes silicon oxynitride.

The first compensation layer has a thickness of about 800 angstroms to about 1500 angstroms and the pixel electrode has a thickness of about 1100 angstroms to about 1300 angstroms.

The display substrate further includes a common electrode disposed under the pixel electrode and applied with a voltage different from a voltage applied to the pixel electrode.

Another aspect is a display substrate including a base substrate that receives an external light incident to an upper portion thereof, an insulating layer disposed under the base substrate and having a first refractive index, a pixel electrode disposed under the insulating layer and having a second refractive index, and a first compensation layer disposed between the insulating layer and the pixel electrode to form an interface with the insulating layer and having a third refractive index greater than the first refractive index and less than the second refractive index. A portion of the external light is reflected by the interface and the reflected light from the interface has a reflective spectrum obtained by changing an inherent reflective spectrum of the insulating layer.

The display substrate further includes an organic layer disposed between the pixel electrode and the first compensation layer to form an interface with the first compensation layer and having a fourth refractive index and the third refractive index is less than the fourth refractive index. The organic layer is a color filter layer having at least one color.

Another aspect is a display panel including a first display substrate that receives an external light and outputs a reflected light and a second display substrate disposed under the first display substrate.

The first display substrate includes a first base substrate that receives the external light incident to an upper portion thereof and has a first refractive index, a first insulating layer disposed under the first base substrate and having a second refractive index different from the first refractive index, a first electrode disposed under the first insulating layer, and a first compensation layer that forms an interface with the first insulating layer and having a third refractive index greater than the first refractive index and less than the second refractive index.

A portion of the external light is reflected by the interface and the reflected light from the interface has a reflective spectrum obtained by changing an inherent reflective spectrum of the first insulating layer. The first electrode has a thickness of about 1100 angstroms to about 1300 angstroms. The first compensation layer is disposed between the first insulating layer and the first electrode.

The display panel further includes a second insulating layer disposed between the first insulating layer and the first electrode.

The display panel further includes a second compensation layer disposed between the second insulating layer and the first electrode to form an interface with the second insulating layer and the second compensation layer has a refractive index between a refractive index of the second insulating layer and a refractive index of the first electrode.

The display panel further includes an organic layer disposed between the second compensation layer and the first electrode to form an interface with the second compensation layer and the refractive index of the second compensation layer is between the refractive index of the second insulating layer and the refractive index of the organic layer. The organic layer is used as a color filter layer.

The second display substrate includes a second base substrate disposed under the first base substrate and a second electrode disposed on the second base substrate to face the first electrode. The display substrate further includes a liquid crystal layer disposed between the first display substrate and the second substrate.

According to at least one embodiment, a compensation layer including silicon oxynitride is disposed on or under an insulating layer in an area corresponding to the transmitting areas, and thus, the reflective spectrum of the insulating layer may be substantially uniform over the wavelength range of visible light. Therefore, the display panel may substantially prevent a specific color from standing out or being degraded, and thus, the display quality of the display panel may be improved.

DETAILED DESCRIPTION OF CERTAIN INVENTIVE EMBODIMENTS

Figure 1:
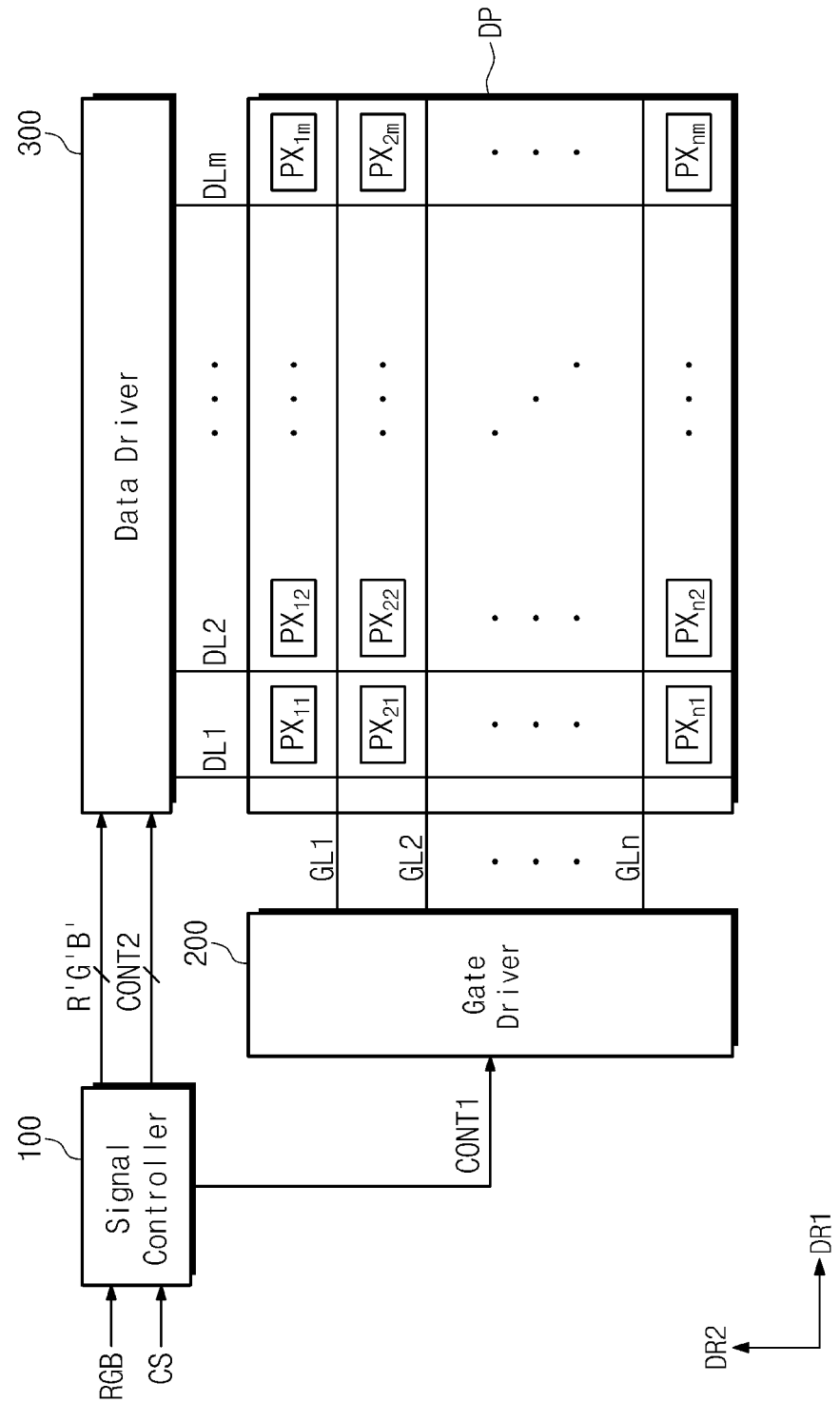
FIG. 1 is a block diagram showing a display device according to an exemplary embodiment.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the described technology.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the described technology. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the described technology belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the described technology will be explained in detail with reference to the accompanying drawings.

Figure 2:
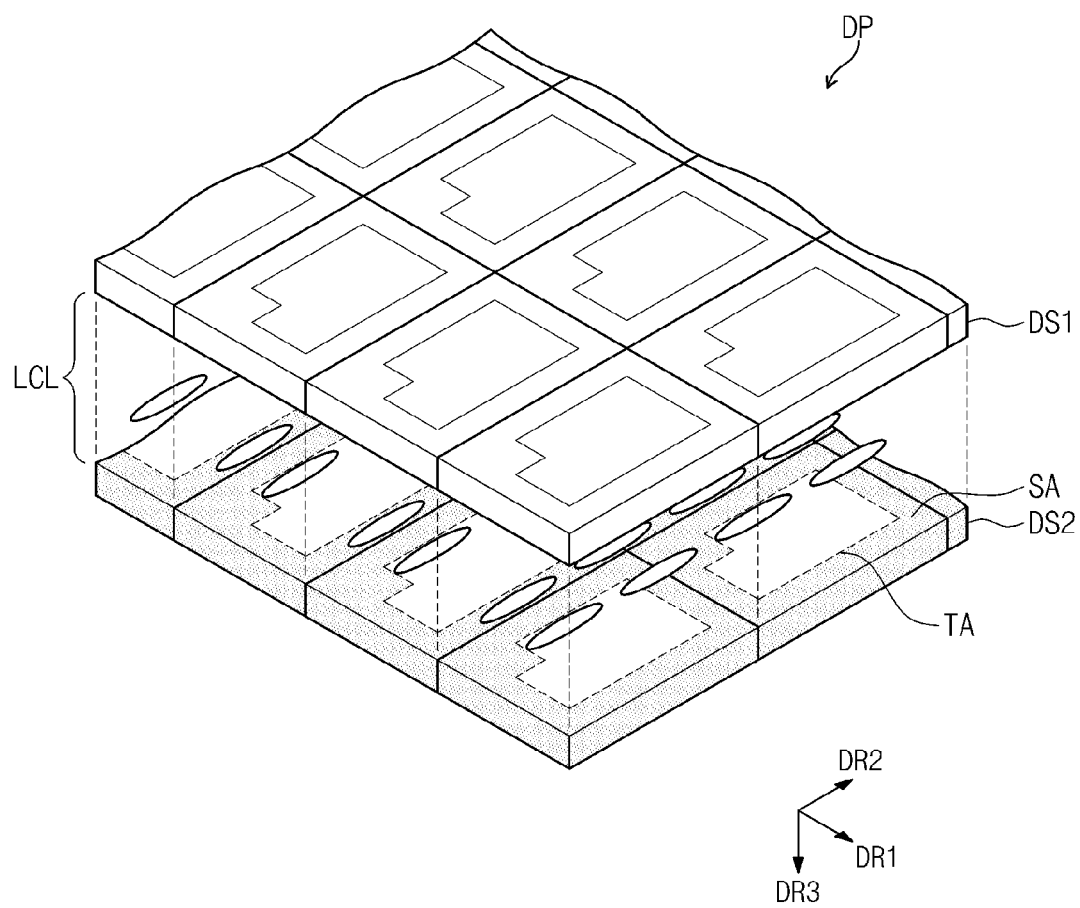
FIG. 2 is a perspective view showing a portion of the display panel shown in FIG. 1.

FIG. 1 is a block diagram showing a display device according to an exemplary embodiment and FIG. 2 is a perspective view showing a portion of the display panel shown in FIG. 1.

Referring to FIG. 1, a display device includes a display panel DP, a signal controller 100, a gate driver 200, and a data driver 300. The display panel DP may be a liquid crystal display (LCD) panel, an organic light-emitting diode (OLED) display panel, an electrophoretic display panel, or an electrowetting display panel.

The display panel DP includes a plurality of signal lines and a plurality of pixels PX11 to PXnm connected to the signal lines. The signal lines are configured to include a plurality of gate lines GL1 to GLn and a plurality of data lines DL1 to DLm. The gate lines GL1 to GLn extend in a first direction DR1 and are arranged in a second direction DR2. The data lines DL1 to DLm are insulated from the gate lines GL1 to GLn and cross the gate lines GL1 to GLn.

Although not shown in figures, the signal lines may further include a plurality of common lines corresponding to the gate lines GL1 to GLn.

The pixels PX11 to PXnm are arranged in a matrix. Each of the pixels PX11 to PXnm is connected to a corresponding gate line and a corresponding data line.

In the present exemplary embodiment, a liquid crystal display (LCD) including an LCD panel will be described as the display device. In this case, the display device may further include a backlight unit. The LCD panel DP may be operated in a vertical alignment (VA) mode, a patterned vertical alignment (PVA) mode, an in-plane switching (IPS) mode, a fringe-field switching (FFS) mode, or a plane-to-line switching (PLS) mode.

The signal controller 100 receives input image signals RGB and converts the input image signals RGB to image data R'G'B' suitable for the operation of the LCD panel DP. In addition, the signal controller 100 receives various control signals CS, such as a vertical synchronization signal, a horizontal synchronization signal, a main clock signal, a data enable signal, etc, and outputs first and second control signals CONT1 and CONT2.

The gate driver 200 applies gate signals to the gate lines GL1 to GLn in response to the first control signal CONT1. The first control signal CONT1 includes a vertical start signal indicating the start the operation of the gate driver 200, a gate clock signal to determine the output timing of the gate voltage, and an output enable signal to determine the on-pulse width of the gate voltage.

The data driver 300 receives the second control signal CONT2 and the image data R'G'B'. The data driver 300 converts the image data R'G'B' to data voltages and applies the data voltages to the data lines DL1 to DLm.

The second control signal CONT2 includes a horizontal start signal indicating the start the operation of the data driver 300, an inverting signal to invert the polarity of the data voltages, and an output indicating signal to determine the output timing of the data voltages from the data driver 300.

As shown in FIG. 2, the LCD panel DP includes a first display substrate DS1 and a second display substrate DS2. The first and second display substrates DS1 and DS2 are spaced apart from each other in a thickness direction DR3 (hereinafter, referred to as third direction) of the LCD panel DP. The first and second display substrates DS1 and DS2 are connected to each other by a sealant (not shown) placed in edge portions of the first and second display substrates DS1 and DS2.

A liquid crystal layer (not shown) is disposed between the first and second display substrates DS 1 and DS2. An external light is incident to an upper portion (or surface) of the first display substrate DS1. The external light is reflected by the first and second display substrates DS1 and DS2. Certain wavelengths of light are reflected with greater intensity due to the properties of the first and second display substrates DS1 and DS2.

The display panel DP includes a plurality of transmitting areas TA and a light blocking area SA disposed adjacent to the transmitting areas TA. The transmitting areas TA transmit the light generated by the backlight unit and the light blocking area SA blocks the light generated by the backlight unit.

The gate lines GL1 to GLn and the data lines DL1 to DLm are disposed on the first display substrate DS1. The gate lines GL1 to GLn and the data lines DL1 to DLm are disposed to overlap with the light blocking area SA. The pixels PX11 to PXnm are disposed to respectively correspond to the transmitting areas TA.

Figure 3:
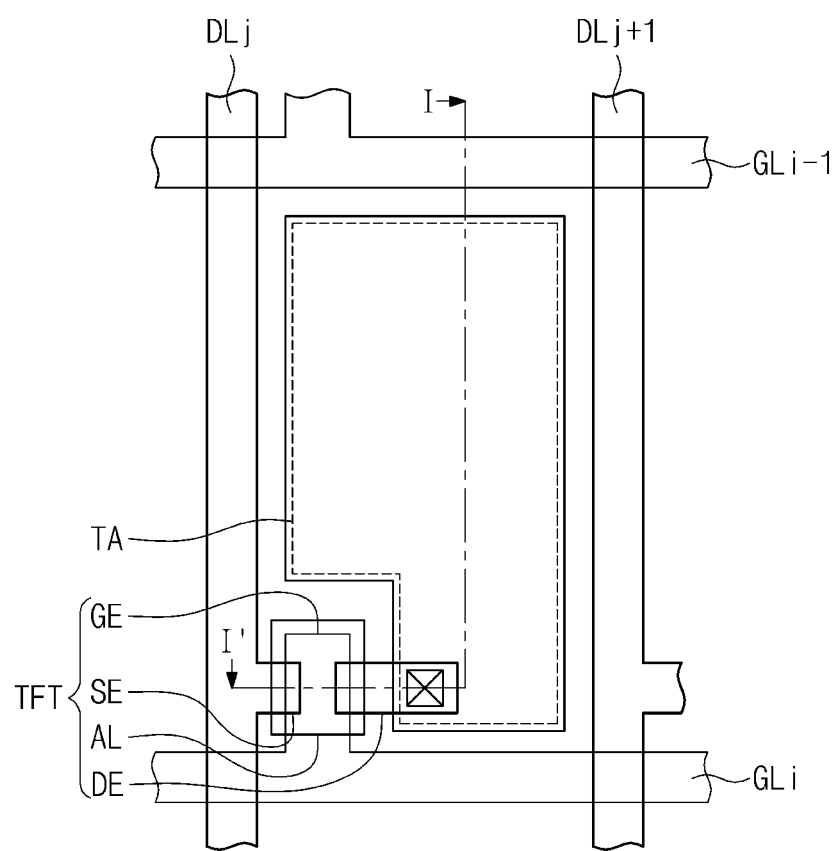
FIG. 3 is a plan view showing a portion of a display panel according to an exemplary embodiment.
Figure 4:
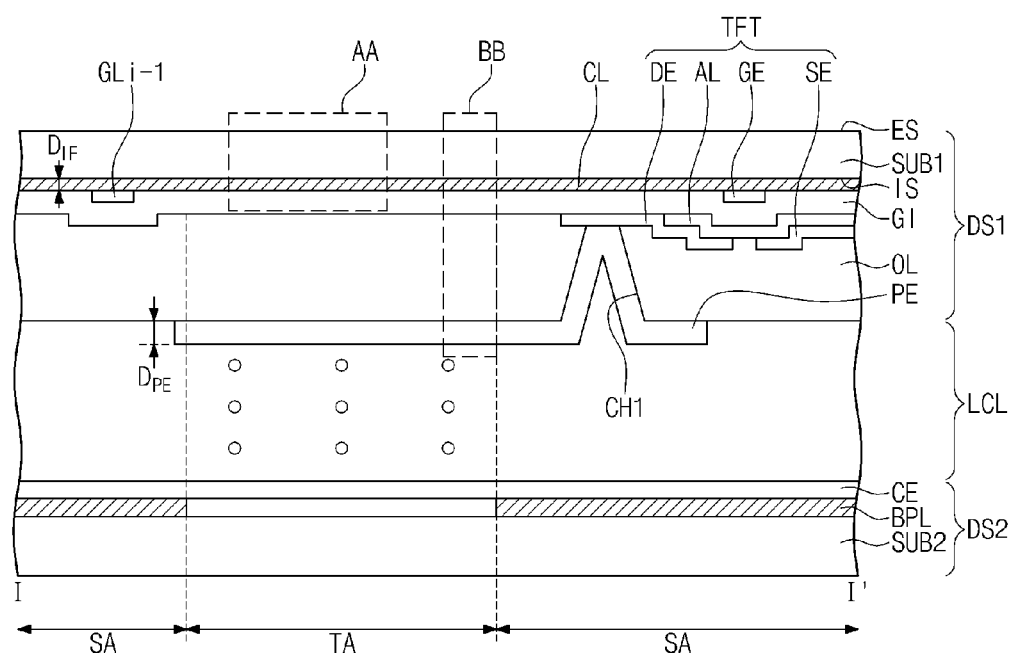
FIG. 4 is a cross-sectional view showing the display panel of FIG. 3.

FIG. 3 is a plan view showing a portion of a display panel according to an exemplary embodiment and FIG. 4 is a cross-sectional view showing the display panel of FIG. 3. FIG. 3 shows an area corresponding to one pixel PXij and FIG. 4 shows the cross-sectional view taken along line I-I' of FIG. 3.

Referring to FIGS. 3 and 4, the first display substrate DS1 includes a first base substrate SUB1, two gate lines GLi−1 and GLi, two data lines DLj and DLj+1, and insulating layers GI and OL.

The pixel PXij is disposed between the first base substrate SUB1 and a second base substrate SUB2. The pixel PXij may be disposed on a lower side of the first base substrate SUB1.

The first base substrate SUB1 includes an inner side surface IS and an outer side surface ES facing the inner side surface IS. The gate lines GLi−1 and GLi and the data lines DLj and DLj+1 are disposed on the inner side surface IS and the external light is incident to the outer side surface ES. The incident external light passes through the first base substrate SUB1 and is then reflected by the above-mentioned components. The first base substrate SUB1 may be a transparent substrate, such as a glass substrate, a plastic substrate, a silicon substrate, etc.

The pixel PXij includes a thin film transistor TFT and a first electrode PE. The thin film transistor TFT is disposed to overlap the light blocking area SA. The first electrode PE is disposed to overlap a corresponding transmitting area of the transmitting areas TA adjacent to the light blocking area SA.

A gate electrode GE of the thin film transistor TFT and the gate line GLi are disposed on the inner side surface IS of the first base substrate SUB1. The gate electrode GE is connected to the gate line GLi. The gate electrode GE is formed of the same material and has the same layer-structure as the gate line GLi.

The gate electrode GE and the gate line GLi include a low reflective material. For instance, the gate electrode GE and the gate line GLi can include titanium, indium zinc oxide, indium tin oxide, copper, or an alloy thereof. In addition, the gate electrode GE and the gate line GLi may have a multi-layer structure including at least one of the above-mentioned materials. The gate electrode GE and the gate line GLi, which include the above-mentioned materials, have a low reflectance with respect to the external light.

The insulating layer GI is disposed under the gate electrode GE. The insulating layer GI is configured to include a plurality of insulating layers to insulate the gate electrode GE from other components. In the present exemplary embodiment, the gate insulating layer GI will be referred to as a gate insulating layer.

The gate insulating layer GI covers the gate electrode GE and the gate line GLi−1. The gate insulating layer GI includes an organic or inorganic material and has a multi-layer structure. The gate insulating layer GI may include a silicon inorganic material. The silicon inorganic material includes at least one of silicon oxide and silicon nitride.

The data lines DLj and DLj+1 are disposed on the gate insulating layer GI. The data lines DLj and DLj+1 include copper (Cu), titanium (Ti), aluminum (Al), or an alloy thereof. The data lines DLj and DLj+1 have a multi-layer structure of different metal layers.

Among the data lines DLj and DLj+1, the data line DLj is connected to a source electrode SE of the thin film transistor TFT. The source electrode SE is formed of the same material and has the same layer-structure as the data lines DLj and DLj+1.

A semiconductor layer AL is disposed under the gate insulating layer GI. A drain electrode DE is disposed under the gate insulating layer GI and spaced apart from the source electrode SE. The source electrode SE and the drain electrode DE overlap the semiconductor layer AL.

A compensation layer CL is disposed between the gate insulating layer GI and the first base substrate SUB1. The compensation layer CL is disposed on the inner side surface IS of the first base substrate SUB1 and forms an interface together with the gate insulating layer GI. The compensation layer CL covers the entire surface of the first base substrate SUB1. The compensation layer CL includes an inorganic material, e.g., silicon oxide, silicon nitride, or silicon oxynitride.

The compensation layer CL has a refractive index greater than that of the first base substrate SUB1 and smaller than that of the gate insulating layer GI. The compensation layer CL compensates for the difference in refractive index between the first base substrate SUB1 and the gate insulating layer GI.

The compensation layer CL may have various thicknesses. The thickness $D_{IF}$ of the compensation layer CL is determined depending on the materials of the layers adjacent thereto and of the compensation layer CL. For instance, when the compensation layer CL includes silicon oxynitride and the gate insulating layer GI includes silicon nitride, the compensation layer CL has the thickness $D_{IF}$ of about 600 angstroms to about 1200 angstroms.

However, the thickness $D_{IF}$ of the compensation layer CL should not be limited thereto or thereby. That is, the thickness $D_{IF}$ of the compensation layer CL may be adjusted by changing the materials of the compensation layer CL and the adjacent layers. The refractive index and thickness of the compensation layer CL have an influence on the spectrum of the light reflected by the gate insulating layer GI.

An organic layer OL is disposed under the gate insulating layer GI to cover the source electrode SE, the drain electrode DE, and the data lines DLj and DLj+1. The organic layer OL planarizes the surface on which the first pixel PE is disposed.

In the present exemplary embodiment, the organic layer OL may be a color filter layer. The color filter layer is disposed on the first base substrate SUB1 similar to the thin film transistor TFT. The organic layer OL may include color patterns having different colors. Each color pattern can have a red, green, blue, or white color.

Although not shown in figures, a passivation layer (not shown) may be further disposed between the gate insulating layer GI and the organic layer OL. The passivation layer can include an inorganic material. When included, the passivation layer covers the source electrode SE, the drain electrode DE, and the data lines DLj and DLj+1 to protect the source electrode SE, the drain electrode DE, and the data lines DLj and DLj+1 from other components.

The first electrode PE is disposed under the organic layer OL or the passivation layer (not shown). The first electrode PE overlaps the transmitting areas TA. The first electrode PE may include a transparent conductive material. For instance, the first electrode PE may include indium zinc oxide, indium gallium oxide, or indium gallium zinc oxide. The first electrode PE improves the transmittance of the transmitting areas TA.

The first electrode PE may have various thicknesses. The thickness $D_{PE}$ of the first electrode PE is determined depending on the materials of the layers adjacent thereto and of the first electrode PE. For instance, when the LCD panel DP includes the first electrode PE having a thickness $D_{PE}$ of about 1100 angstroms to about 1300 angstroms, the reflectance of the LCD panel DP may be lowered. However, the thickness $D_{PE}$ of the first electrode PE should not be limited thereto or thereby.

As show in FIG. 4, the first electrode PE is connected to the drain electrode DE of the thin film transistor TFT through a contact hole CH1 formed in the organic layer OL. In the present exemplary embodiment, the first electrode PE will be referred to as a pixel electrode. Although not shown in figures, a protective layer (not shown) that protects the pixel electrode PE and an alignment layer (not shown) may be further disposed on the pixel electrode PE.

Although not shown in figures, a capping layer (not shown) may be further disposed between the organic layer OL and the first electrode PE. The capping layer may include an organic or inorganic material. For instance, the capping layer may be an overcoating layer formed of an organic material to planarize the organic layer OL, or the capping layer may be a passivation layer formed of an inorganic material to planarize the organic layer OL and the thin film transistor TFT.

The second display substrate DS2 is disposed under the first display substrate DS1. The second display substrate DS2 includes a second base substrate SUB2, a light blocking pattern layer BPL, and a second electrode CE. According to some embodiments, the light blocking pattern layer BPL and the second electrode CE are disposed on the first display substrate DS1.

The light blocking pattern layer BPL and the second electrode CE are disposed on a surface of the second base substrate SUB2 which faces the first display substrate DS1. The second base substrate SUB2 may include the same material as the first base substrate SUB1, but it should not be limited thereto or thereby.

The light blocking pattern layer BPL includes a plurality of light blocking patterns. The area in which the light blocking patterns are disposed corresponds to the light blocking area SA and the area in which the light blocking patterns are not disposed corresponds to the transmitting areas TA. The light blocking patterns overlap the data lines DLj and DLj+1, the gate lines GLi-1 and GLi, and the thin film transistor TFT. In the present exemplary embodiment, the light blocking pattern layer BPL serve as a black matrix.

The light blocking pattern layer BPL substantially prevents the light generated by the backlight unit and traveling to the second base substrate SUB2 from being incident to the areas in which the data lines DLj and DLj+1 and the thin film transistor TFT are disposed. In addition, the light blocking pattern layer BPL substantially prevents external light incident to the first base substrate SUB1 and traveling to the second base substrate SUB2 from being reflected by the second base substrate SUB2.

Although not shown in figures, a planarization layer may be further disposed on the light blocking pattern layer BPL. The planarization layer planarizes the light blocking pattern layer BPL. In the present embodiment, the second electrode CE is disposed on the light blocking pattern layer BPL or the planarization layer, however, according to other embodiments, the second electrode CE is disposed on the first display substrate DS1.

The second electrode CE is disposed to face the first electrode PE. The first and second electrodes PE and CE form an electric field therebetween. Hereinafter, the second electrode CE will be referred to as a common electrode.

The common electrode CE is disposed on the entire surface of the second base substrate SUB2. Although not shown in figures, a protective layer (not shown) that protects the common electrode CE and an alignment layer may be further disposed on the common electrode.

The liquid crystal layer LCL is disposed between the first and second display substrates DS 1 and DS2. The liquid crystal layer LCL may be sealed between the first and second display substrates DS1 and DS2 by using a spacer (not shown). Liquid crystal molecules of the liquid crystal layer LCL are realigned by the electric field formed between the pixel electrode PE and the common electrode CE.

The thin film transistor TFT outputs the data voltage applied to the data line DLj in response to the gate signal applied to the gate line GLi. The pixel electrode PE receives a pixel voltage corresponding to the data voltage and the common electrode CE receives a common voltage. The pixel electrode PE and the common electrode CE form a vertical electric field therebetween. Due to the vertical electric field, the arrangement of directors of the liquid crystal molecules included in the liquid crystal layer LCL is changed.

Although not shown in figures, according to another embodiment, the common electrode CE may be disposed on the first display substrate DS1 in a PLS mode LCD panel. In this case, the pixel electrode PE and the common electrode CE form a lateral electric field. Due to the lateral electric field, the arrangement of directors of the liquid crystal molecules included in the liquid crystal layer LCL is changed. To this end, the pixel electrode PE or the common electrode CE may include a plurality of slits (not shown).

According to another embodiment, the display panel may include only one display substrate. For example, the first display substrate DS1 may include an OLED electrically connected to the thin film transistor TFT.

Figure 5A:
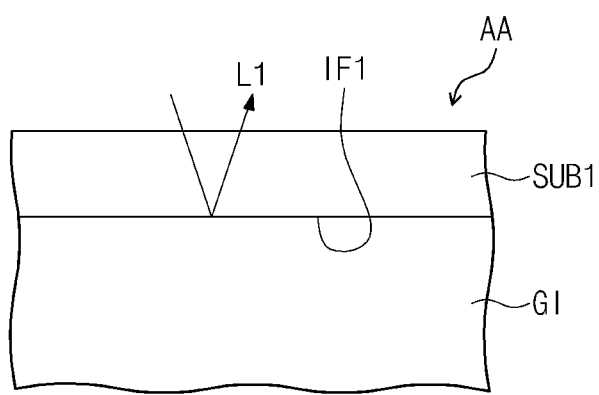
FIG. 5A is a cross-sectional view showing a display substrate in which a compensation layer is not included.
Figure 5B:
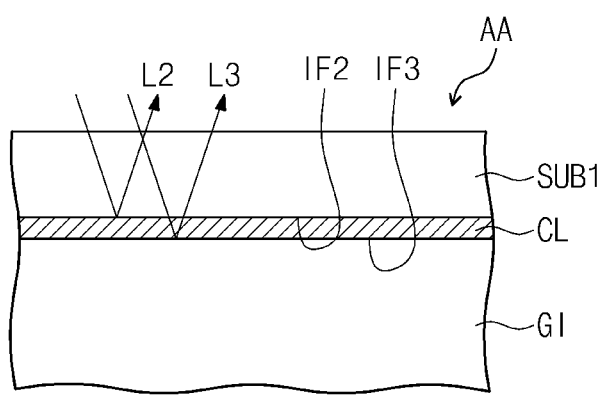
FIG. 5B is a cross-sectional view showing a display substrate according to an exemplary embodiment.

FIG. 5A is a cross-sectional view showing a display panel in which a compensation layer is not included and FIG. 5B is a cross-sectional view showing a display substrate according to an exemplary embodiment. FIGS. 5A and 5B show the cross-sectional views of an area corresponding to portion AA shown in FIG. 4. For the convenience of explanation, FIGS. 5A and 5B respectively show the display panel not including the compensation layer CL and the display panel including the compensation layer CL.

As shown in FIGS. 5A and 5B, the external light incident to the outer side surface of the first display substrate DS1 is reflected by the components included in the first display substrate DS1. Due to the properties and configuration of the components included in the first display substrate DS1, certain wavelengths of light are reflected with greater intensity than other wavelengths. The reflected lights interact with each other through interferences between layers included in the first display substrate DS1. The amount of the reflected lights reflected in the transmitting areas TA is greater than the amount of the reflected lights reflected in the other areas of the display panel.

Referring to FIG. 5A, the first base substrate SUB1 and the insulating layer GI form an interface IF1 therebetween when the display substrate does not include the compensation layer CL. The external light incident through the first base substrate SUB1 is partially reflected by the interface IF1 between the first base substrate SUB1 and the insulating layer GI after passing through the first base substrate SUB1, and thus, a first reflective light L1 is generated.

However, the display substrate according to the present embodiment includes the compensation layer CL disposed between the first base substrate SUB1 and the insulating layer GI. Accordingly, as shown in FIG. 5B, the compensation layer CL forms an interface IF2 with the first base substrate SUB1 and forms an interface IF3 with the insulating layer GI.

A portion of the external light incident through the first base substrate SUB1 is reflected by the interface IF2 formed between the first base substrate SUB1 and the compensation layer CL, and thus, a second reflective light L2 is generated at the interface IF2 between the first base substrate SUB1 and the compensation layer CL. Another portion of the external light is reflected by the interface IF3 formed between the compensation layer CL and the insulating layer GI after passing through the compensation layer CL, and thus, a third reflective light L3 is generated.

The lights reflected by the interfaces have a reflective spectrum in which the reflectance is dependent on the wavelength of the reflected lights. The reflective spectrum is dependent on the difference in refractive index between the layers that form the interfaces. In general, as the difference in refractive index between the layers increases, the reflectance in the reflective spectrum according to the wavelength also increases.

The display substrate according to the present exemplary embodiment further includes the compensation layer CL. The compensation layer CL includes a material having a refractive index between the refractive indices of the two layers adjacent to the compensation layer CL. For instance, when the first base substrate SUB1 includes a glass substrate with the refractive index of about 1.5 and the insulating layer GI includes silicon nitride with a refractive index of about 1.8, the compensation layer CL includes a material with a refractive index between about 1.5 to about 1.8. Particularly, the compensation layer CL may include silicon oxynitride with a refractive index of about 1.6.

The compensation layer CL compensates for the difference in refractive index between the two adjacent layers. The first reflective light L1 is reflected by the interface IF1 having a refractive index difference of about 0.3, and thus, the reflective spectrum is represented by an irregular curve. The second and third reflective lights L2 and L3 are reflected by the interfaces IF2 and IF3 each having a refractive index difference less than about 0.3. Therefore, the compensation layer CL may reduce the difference in refractive index between the two adjacent layers and generate a reflective spectrum having a regular reflectance according to the wavelength.

As described above, the reflectance of the display substrate according to the present exemplary embodiment is changed depending on the materials of the layers, but the thickness of the compensation layer CL also influences the reflectance of the display substrate. It is difficult to adjust thicknesses of the adjacent layers due to the design requirements of the layers, however, the thickness of the compensation layer CL may be easily adjusted since the compensation layer CL is additionally formed. Thus, the reflectance of the display substrate may be lowered and the display quality of the display panel may be improved.

Figure 6:
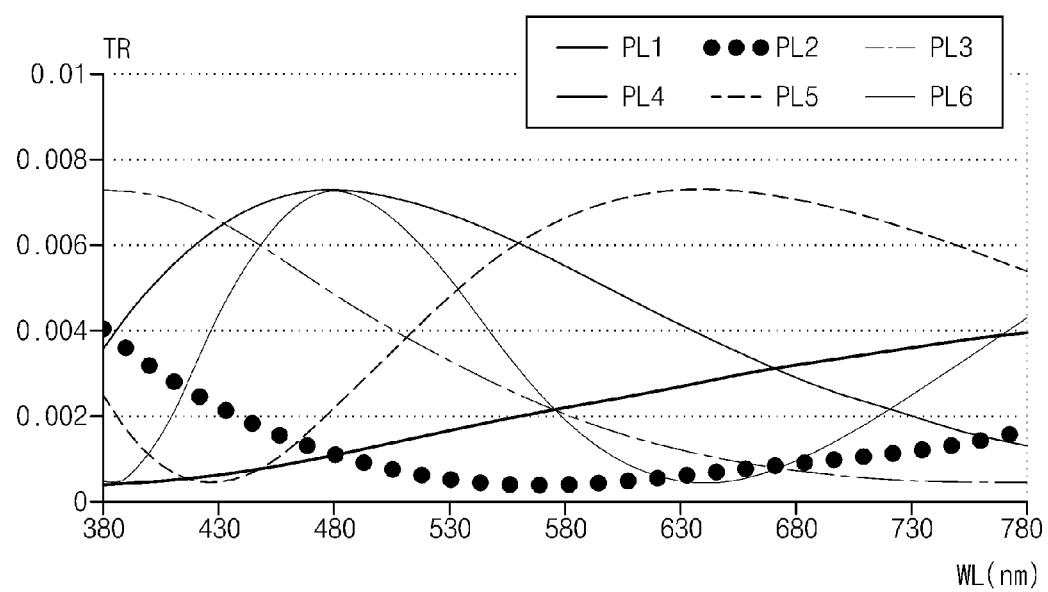
FIG. 6 is a graph showing a reflective spectrum as a function of a compensation layer according to an exemplary embodiment.

FIG. 6 is a graph showing the reflective spectrum as a function of the thickness of the compensation layer CL according to an exemplary embodiment. FIG. 6 shows reflective spectrums PL1 to PL6 when the compensation layers include silicon oxynitride and respectively have thicknesses of about 600 angstroms, about 900 angstroms, about 1200 angstroms, about 1500 angstroms, about 2000 angstroms, and about 3000 angstroms. The wavelengths illustrated are limited to the wavelength range of visible light, e.g., about 380 nm to about 780 nm.

The reflective spectrums PL4, PL5, and PL6 of the compensation layers having a thickness of about 1500 angstroms or more have at least one peak reflectance in the visible light range. For instance, the reflective spectrum PL4 of the compensation layer having the thickness of about 1500 angstroms has a peak reflectance at the wavelength of about 480 nm and the reflectance becomes lower with reference to the wavelength of about 480 nm.

The reflective spectrum PL5 of the compensation layer having the thickness of about 2000 angstroms has a peak reflectance at the wavelength of about 640 nm and the reflectance becomes lower with reference to the wavelength of about 680 nm. The reflective spectrum PL6 of the compensation layer having the thickness of about 3000 angstroms has a peak reflectance at the wavelength of about 480 nm and has a minimum reflectance at the wavelength of about 630 nm.

The peak reflectance indicates the reflectance at a specific wavelength range, which is higher or lower than the reflectance in the adjacent wavelength range. The peak reflectance is generated by a constructive interference of the light reflected from the interfaces IF2 and IF3. The reflected light in the wavelength range indicated by the peak reflectance is irregularly reflected in the visible light range. Accordingly, variation in the brightness of the reflected light is not uniform and a specific color stands out, and thus, the display quality of the display panel is deteriorated.

In contrast to the above-mentioned reflective spectrums PL4, PL5, and PL6, there is no peak reflectance in the reflective spectrums PL1, PL2, and PL3 of the compensation layers having a thickness of about 1200 angstroms or less. The reflective spectrum PL1 of the compensation layer having the thickness of about 600 angstroms increases linearly in the visible light range. The reflective spectrum PL2 of the compensation layer having the thickness of about 900 angstroms gradually decreases in the visible light range and gradually increases after the wavelength of about 580 nm. The reflective spectrum PL3 of the compensation layer having the thickness of about 1200 angstroms gradually decreases in the visible light range.

In addition, the reflective spectrums PL1, PL2, and PL3 of the compensation layers having the thickness of about 1200 angstroms or less have a reflectance lower than the reflective spectrums PL4, PL5, and PL6 of the compensation layers in the wavelength range of about 550 nm. Light having a wavelength of about 550 nm is a green-based color.

In general, a user is sensitive to light in the wavelength range of about 530 nm to about 600 nm. Therefore, when the user watches the display panel, greenish stains or a green-based color are strongly perceived by the user.

The compensation layers having the thickness of about 600 angstroms to about 1200 angstroms have a minimum reflectance in different wavelength ranges. Thus, the color of the display panel may be controlled by selecting the wavelength range in which the minimum reflectance appears. For instance, the compensation layer having the thickness of about 600 angstroms reduces the reflectance of the light having a blue- or violet-based color, e.g., the wavelength range of about 380 nm to about 500 nm.

The compensation layer having the thickness of about 900 angstroms reduces the reflectance of the light having green-based color, e.g., the wavelength range of about 500 nm to about 680 nm. The compensation layer having the thickness of about 1200 angstroms reduces the reflectance of the light having a red-based color, e.g., the wavelength range of about 630 nm to about 780 nm.

When the compensation layer has the thickness of about 600 angstroms to about 1200 angstroms, the reflectance distribution is uniform in the visible light wavelength range as shown in FIG. 6. In addition, the reflective spectrum of the compensation layer with the thickness of about 600 angstroms to about 1200 angstroms represents the relatively low reflectance in the green color wavelength range. Thus, the reflectance is lowered and the color is compensated in the display panel according to the present exemplary embodiment, thereby improving the display quality of the display panel.

Figure 7A:
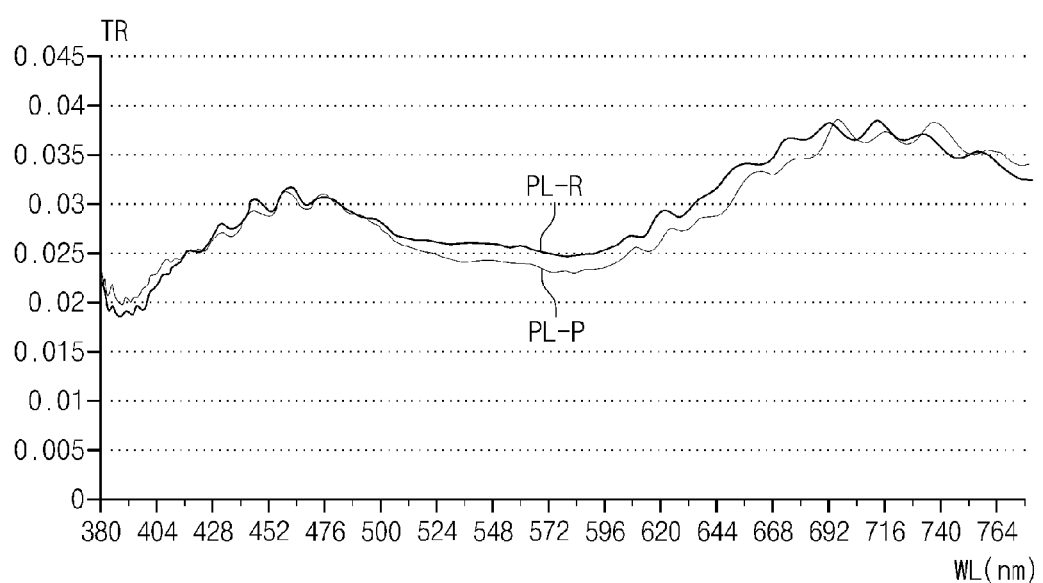
FIG. 7A is a graph showing a total reflective spectrum of a display panel according to another exemplary embodiment.

FIG. 7A is a graph showing a total reflective spectrum of a display panel according to an exemplary embodiment. For the convenience of explanation, FIG. 7A shows the reflective spectrum PL-R (hereinafter, referred to as first reflective spectrum) of the display panel not including the compensation layer LC and the reflective spectrum PL-P (hereinafter, referred to as second reflective spectrum) including the compensation layer CL. In FIG. 7A, the compensation layer CL includes silicon oxynitride and has a thickness of about 1000 angstroms.

Referring to FIG. 7A, the first reflective spectrum PL-R and the second reflective spectrum PL-P have the similar reflectance for each wavelength, but the second reflective spectrum PL-P has a reflectance lower than that of the first reflective spectrum PL-R in the wavelength range of about 500 nm to about 700 nm.

The first reflective spectrum PL-R includes the spectrum of the light reflected by the interface formed between the first base substrate SUB1 (refer to FIG. 4) and the insulating layer GI (refer to FIG. 4). The second reflective spectrum PL-P, however, is obtained by the structure in which the compensation layer CL is disposed between the first base substrate SUB1 and the insulating layer GI.

In the present exemplary embodiment, the first base substrate SUB1 and the insulating layer GI do not have an interface therebetween. Accordingly, the second reflective spectrum PL-P does not include the spectrum of the light reflected by the interface formed between the first base substrate SUB1 and the insulating layer GI. The second reflective spectrum PL-P includes the spectrum of the light obtained by mixing the light reflected by the interface between the first base substrate SUB1 and the compensation layer CL and the light reflected by the interface between the compensation layer CL and the insulating layer GI.

As described above, the compensation layer CL has a refractive index between the refractive indices of the two layers having interfaces with the compensation layer CL. The refractive index of the compensation layer CL is greater than that of the first base substrate SUB1 and less than that of the insulating layer GI. Therefore, the difference in refractive index between the first base substrate SUB1 and the insulating layer GI is reduced.

The spectrum of the light from the upper surface of the insulating layer GI is varied depending on a refractive index of a component that forms the interface together with the upper surface of the insulating layer GI. The spectrum of the reflected light when the first base substrate SUB1 is disposed on the insulating layer GI is different from the spectrum of the reflected light when the compensation layer CL is disposed on the insulating layer GI. As the difference in refractive index between the two layers becomes smaller, the reflectance of the reflected light reflected by the interface between the two layers becomes reduced.

As shown in FIG. 7A, since the display panel according to the present exemplary embodiment further includes the compensation layer CL, the refractive index of the wavelength range of about 500 nm to about 700 nm is reduced. The light in the wavelength range of about 500 nm to about 700 nm has the green-based color or the blue-based color. In particular, the display panel reduces the reflectance of the green-based light, and thus, the display quality of the display panel may be improved.

Figure 7B:
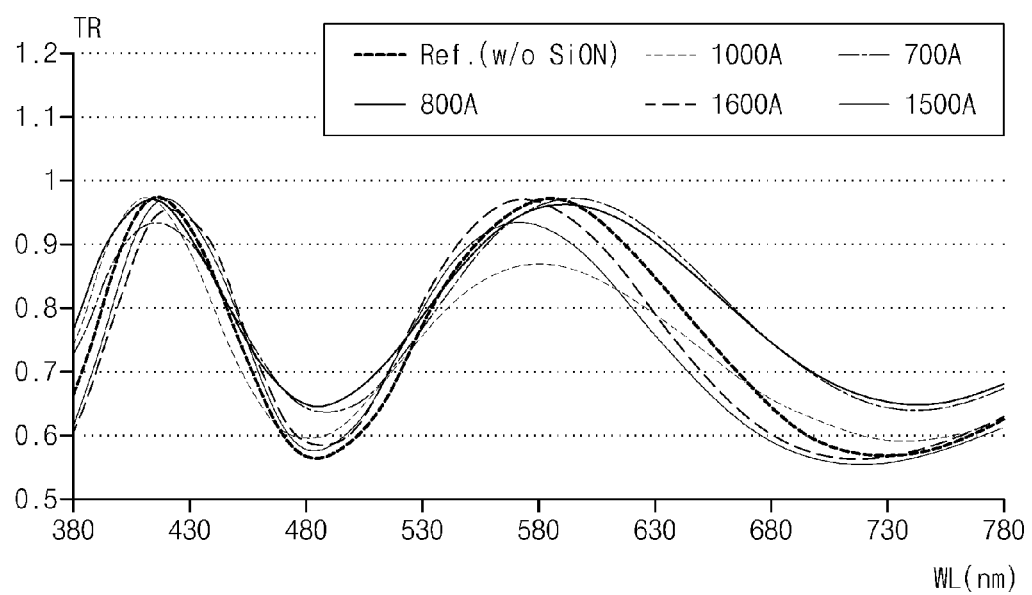
FIG. 7B is a graph showing a total reflective spectrum of a display panel according to yet another exemplary embodiment.

FIG. 7B is a graph showing a total reflective spectrum of a display panel according to an exemplary embodiment. For the convenience of explanation, reflective spectrums of display panels provided with compensation layers having different thicknesses have been shown in FIG. 7B.

In FIG. 7B, the compensation layers having different thicknesses are applied to display panels each including the insulating layer GI with a refractive index of about 1.78 and a thickness of about 4100 angstroms and the color filter layer CF with a refractive index of about 1.6 and a thickness of about 3.2 micrometers. The compensation layers CL include silicon nitride, have a refractive index of about 1.55, and have a thicknesses of about 700 angstroms, about 800 angstroms, about 1000 angstroms, about 1500 angstroms, and about 1600 angstroms, respectively.

Referring to FIG. 7B, when the reflective spectrum of the display panel that does not include the compensation layer CL is referred to as a reference spectrum, the reference spectrum is represented by a plot in which the amplitude is largest in the visible light wavelength range. However, the reflective spectrums of the display panels including the compensation layer CL are represented by the plot in which the amplitude is less than that of the reference spectrum. This means that the reflective spectrum of the display panel may be improved when the display panel further includes the compensation layer CL.

As described above, when the thickness of the compensation layer CL is changed, an inherent refractive index (refer to FIG. 6) of the compensation layer CL is changed. The inherent refractive index of the compensation layer CL has an influence on the display panel, and thus, the reflective spectrums of the insulating layers adjacent to the compensation layers are changed. In addition, when the thickness of the compensation layer CL is changed, the wavelength range in which a relatively small amplitude of reflected light appears is changed. Therefore, the color reflected by the display panel may be compensated for.

As shown in FIG. 7B, the reflective spectrum of the display panel including the compensation layer CL with the thickness of about 1000 angstroms has a gradual variation in amplitude over a wide wavelength range. That is, the compensation layer CL having the thickness of about 1000 angstroms uniformly controls the reflective spectrum of the display panel.

In general, however, the decrease of the reflectance and the compensation of the color are individually varied without being proportional or inversely proportional to one another. For instance, the display panel including the compensation layer with the thickness of about 700 angstroms has a substantially uniform reflectance compared to the reference display panel, but the reflectance is increased in the wavelength range near about 480 nm and in the wavelength range of about 680 nm or greater. Thus, the color corresponding to the wavelength range may stand out to the user.

The compensation layer CL substantially uniformly maintains the whole reflective spectrum of the display panel, but the reflective spectrum may be selectively decreased or increased with respect to a specific color by adjusting the thickness of the compensation layer CL. For instance, the reflective spectrum including a decrease in reflectance and preventing a greenish phenomenon can be obtained when the thickness of the compensation layer CL is about 800 angstroms to about 1500 angstroms as shown in FIG. 7B.

As described above, since the display panel further includes the compensation layer CL, the reflective spectrum may be uniformly improved. In addition, when the thickness of the compensation layer CL is adjusted, the reflectance may be improved and the color may be selectively compensated, thereby improving the display quality.

Figure 8A:
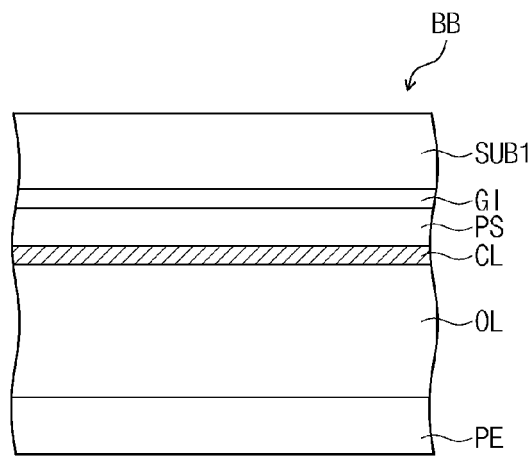
FIG. 8A is a cross-sectional view showing a portion of a display substrate according to an exemplary embodiment.
Figure 8B:
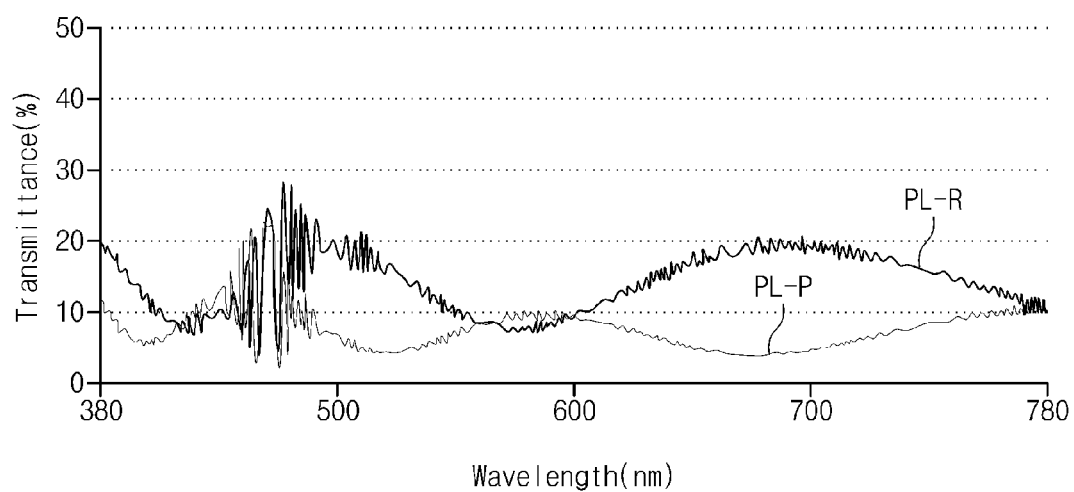
FIG. 8B is a graph showing a reflective spectrum of a display panel according to an exemplary embodiment.

FIG. 8A is a cross-sectional view showing a portion of a display panel according to an exemplary embodiment and FIG. 8B is a graph showing a reflective spectrum of a display panel according to an exemplary embodiment. FIG. 8A shows the cross-sectional view corresponding to a portion BB shown in FIG. 4, and FIG. 8B shows the reflective spectrum of the display panel, which is obtained through a simulated test.

Referring to FIG. 8A, the compensation layer CL may be disposed between the insulating layer and the organic layer OL. The compensation layer CL forms interfaces with each of the insulating layer and the organic layer OL.

The insulating layer may include a plurality of insulating layers. In some embodiments, the insulating layers are configured to include the gate insulating layer GI and the passivation layer PS. In these embodiments, the passivation layer PS is a second insulating layer. Although not shown in figures, the passivation layer PS covers the thin film transistor TFT (refer to FIG. 4). In other embodiments, the insulating layers are configured to include the gate insulating layer GI and the organic layer OL. In these embodiments, the organic layer OL is a second insulating layer.

The compensation layer CL is disposed between the passivation layer PS and the organic layer OL. The compensation layer CL compensates for the difference in refractive index between the passivation layer PS and the organic layer OL. The compensation layer CL includes a material selected depending on the refractive indices of materials used to form the passivation layer PS and the organic layer OL, each of which forms the interfaces with the compensation layer CL. The compensation layer CL has a refractive index between the refractive indices of the passivation layer PS and the first electrode PE.

For instance, when the passivation layer PS includes silicon nitride and the first electrode PE includes indium tin oxide (ITO), the compensation layer CL may include silicon oxynitride. The compensation layer CL including silicon oxynitride may have a refractive index controlled by the ratio of nitrogen atoms included in the compound. Accordingly, the compensation layer CL may have various refractive indices between the refractive index of silicon nitride and the refractive index of indium tin oxide.

FIG. 8B shows a reflective spectrum PL-R (hereinafter, referred to as third reflective spectrum) of the light reflected by the insulating layer of the display panel not including the compensation layer CL and a reflective spectrum PL-P (hereinafter, referred to as fourth reflective spectrum) of the light reflected by the insulating layer of the display panel including the compensation layer CL.

Referring to FIG. 8B, the third reflective spectrum PL-R has a curve similar to a sine function including two peak reflectances in the visible light range. Substantially, the third reflective spectrum PL-R has a maximum reflectance at wavelength ranges near about 480 nm and about 700 nm.

The fourth reflective spectrum PL-P has only one peak reflectance when compared to the third reflective spectrum PL-R. The peak reflectance of the fourth reflective spectrum PL-P appears at a wavelength range near about 600 nm. The peak reflectance of the fourth reflective spectrum PL-P, near about 600 nm, is positioned between the two peak reflectances of the third reflective spectrum PL-R.

The reflectance of the fourth reflective spectrum PL-P in the wavelength ranges near about 480 nm and about 700 nm are considerably less than those of the third reflective spectrum PL-R in the same ranges. There is not a large difference between the reflectance at the wavelength range near about 600 nm, in which the peak reflectance of the fourth reflective spectrum PL-P appears, and the reflectances at other wavelength ranges of the fourth reflective spectrum PL-P.

The fourth reflective spectrum PL-P has a curve inverse to that of the third reflective spectrum PL-R. The fourth reflective spectrum PL-P has a broad curve in which variations in reflectance are not extreme in the visible light range.

The third reflective spectrum PL-R includes the spectrum of the light reflected by the interface formed between the passivation layer PS and the first electrode PE. According to the present embodiment shown in FIG. 8A, an interface is not formed between the passivation layer PS and the first electrode PE. Therefore, the fourth reflective spectrum PL-P does not include the spectrum of the light reflected by the interface between the passivation layer PS and the first electrode PE.

In contrast to the third reflective spectrum PL-R of the comparative display panel not including the compensation layer CL, the fourth reflective spectrum PL-P includes the spectrum of the light obtained by mixing the light reflected by the interface between the passivation layer PS and the compensation layer CL and the light reflected by the interface between the compensation layer CL and the first electrode PE. As described above, the compensation layer CL compensates for the difference in refractive index between the passivation layer PS and the first electrode PE to lower the reflectance of the display panel.

Figure 9A:
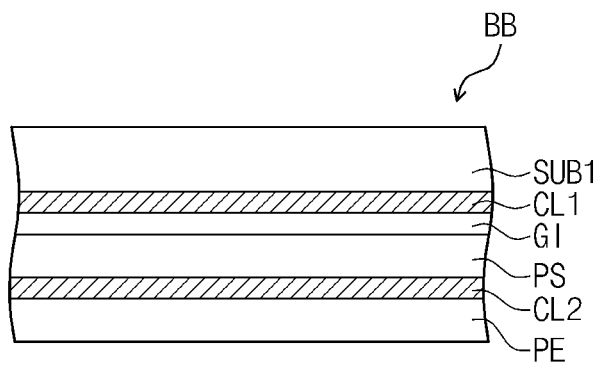
FIGS. 9A and 9B are cross-sectional views showing portions of display substrates according to exemplary embodiments.
Figure 9B:
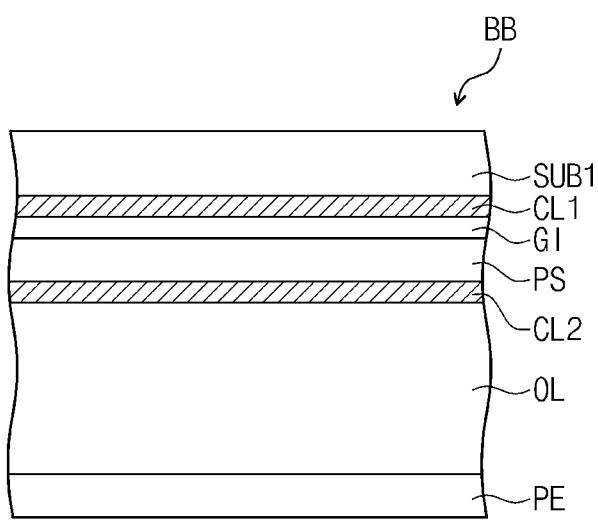

FIGS. 9A and 9B are cross-sectional views showing portions of display substrates according to exemplary embodiments. FIGS. 9A and 9B show the cross-sectional views corresponding to the portion BB shown in FIG. 4. In FIGS. 9A and 9B, the same reference numerals denote the same elements in FIGS. 1 to 8, and thus detailed descriptions of the same elements will be omitted.

As shown in FIGS. 9A and 9B, the display substrate may include a plurality of compensation layers CL1 and CL2. Each of the compensation layers CL1 and CL2 is disposed adjacent to an insulating layer. Each of the plurality of compensation layers CL1 and CL2 has a refractive index with a value between the refractive indices of layers adjacent to the respective compensation layers CL1 and CL2. Each of the compensation layers CL1 and CL2 compensates for the difference between the refractive indices of the layers adjacent to the compensation layer.

The smaller the difference between the refractive indices of the layers forming an interface is, the lower the reflectance of light from the interface is. The compensation layer decreases the reflectance of a display panel by reducing the difference between the refractive indices of adjacent layers in the display device.

As an example, the first compensation layer CL1 is disposed between the first base substrate SUB1 and the gate insulating layer GI. In case that the refractive index of the first base substrate SUB1 is less than the refractive index of the gate insulating layer GI, the refractive index of the first compensation layer CL1 is greater than that of the first base substrate SUB1 and less than that of the gate insulating layer GI. The first compensation layer CL1 compensates for the difference between the refractive index of the first base substrate SUB1 and the refractive index of the gate insulating layer GI which are adjacent to the first compensation layer CL1.

The first compensation layer CL1 forms an interface with the gate insulating layer GI. The spectrum of the light reflected by the interface between the compensation layer CL1 and the gate insulating layer GI changes the inherent reflective spectrum of the gate insulating layer GI.

Referring to FIG. 9A, a passivation layer PS and a first electrode PE are disposed under the gate insulating layer GI. The second compensation layer CL2 is disposed between the first electrode PE and the passivation layer PS. The second compensation layer CL2 compensates for the difference between the refractive index of the passivation layer PS and the refractive index of the first electrode PE.

The second compensation layer CL2 has a refractive index between the refractive index of the passivation layer PS and the refractive index of the first electrode PE. In general, the refractive index of the first electrode PE is greater than the refractive index of the passivation layer PS. Therefore, the refractive index of the second compensation layer CL2 is greater than that of the passivation layer PS and less than that the first electrode PE. However, when the refractive index of the first electrode PE is less than that of the passivation layer PS, the refractive index of the second compensation layer CL2 may be less than that the passivation layer PS and greater than that the first electrode PE.

Although not shown in figures, the second compensation layer CL2 is disposed between insulating layers to form interfaces with the insulating layers. For instance, the second compensation layer CL2 is disposed between the gate insulating layer GI and the passivation layer PS. The second compensation layer CL2 has a refractive index between the refractive index of the gate insulating layer GI and the refractive index of the passivation layer PS. The second compensation layer CL2 has an outstanding effect of lowering the reflectance of the display panel in the case of a larger difference between the refractive indices of the gate insulating layer GI and the passivation layer PS.

As shown in FIG. 9B, the display substrate may further include the organic layer OL disposed between the passivation layer PS and the first electrode PE, and in this case, the second compensation layer CL2 is disposed between the passivation layer PS and the organic layer OL. The second compensation layer CL2 compensates a difference between the refractive indices of the passivation layer PS and the organic layer OL. The compensation layer CL2 has a refractive index greater than that of the organic layer OL and less than that of the passivation layer PS.

The second compensation layer CL2 forms an interface with the passivation layer PS. The spectrum of the light reflected by the interface between the second compensation layer CL2 and the passivation layer PS changes the inherent reflective spectrum of the passivation layer PS.

The display substrate according to the present exemplary embodiment may decrease the reflectance of the display panel by adjusting the thickness of the first electrode PE. Simulated results of the reflectance of the display panel have been shown in Table 1 below.

TABLE 1

| | Reflectance (%, 400 nm~780 nm) | | | |
|---|---|---|---|---|
| | AVG. | 450 nm | 550 nm | 650 nm |
| First embodiment | 10.6 | 19.7 | 10.5 | 8.9 |
| Second embodiment | 10.0 | 8.3 | 11.0 | 5.5 |
| Third embodiment | 7.9 | 5.5 | 6.2 | 8.9 |

The simulated results shown in Table 1 are obtained by performing a simulation test on the display panel configured to include the base substrate, the gate insulating layer disposed on the base substrate, the passivation layer disposed on the gate insulating layer, the organic layer disposed on the passivation layer, the pixel electrode disposed on the organic layer, the liquid crystal layer disposed on the pixel electrode, and the color filter layer disposed on the liquid crystal layer.

Table 1 shows the reflectance of each of a first embodiment related to the display panel including the pixel electrode with a thickness of about 550 angstroms, a second embodiment related to the display panel including the first and second compensation layers CL1 and CL2, and a third embodiment related to the display panel including the pixel electrode with a thickness of about 1250 angstroms. The average reflectance (AVG.) shown in Table 1 is obtained with reference to the visible light wavelength range of about 400 nm to about 780 nm.

As shown in Table 1, there is no big difference between the average reflectance of the first embodiment and the average reflectance of the second embodiment. However, the reflectance is considerably reduced compared to the first and second embodiments in the wavelength range of about 450 nm to about 650 nm, which corresponds to the wavelength range of the green and blue-based colors mainly perceived by the user.

In addition, referring to Table 1, the average reflectance of the third embodiment is reduced compared to those of the first and second embodiments. The reflectance in the wavelength of about 650 nm is increased, but it is similar to that of the first embodiment, and the reflectance in the wavelength range of about 450 nm to about 550 nm, in which the green-based color strongly appears, is considerably reduced. Consequently, when the display panel further includes the compensation layer and the thickness of the pixel electrode is adjusted, the display panel with a low reflectance may be embodied.

Referring to FIG. 4, the display panel is manufactured by forming the first and second display substrates DS1 and DS2 and coupling the first and second display substrates DS1 and DS2. The upper surface of the first display substrate DS1, on which the thin film transistor TFT is formed, is disposed to face the liquid crystal layer LCL.

Referring to FIGS. 9A and 9B, the first compensation layer CL1 is formed on the first base substrate SUB1. The first compensation layer CL1 is formed of an organic or inorganic material to have a refractive index greater than that of the first base substrate SUB1 and less than that of the gate insulating layer GI. For instance, the first compensation layer CL1 may be formed of silicon oxynitride (SiON). The first compensation layer CL1 may be formed by a deposition method or a sputtering method, but it should not be limited thereto or thereby.

As an example, the first compensation layer CL1 may be formed by a chemical vapor deposition method. To this end, the first base substrate SUB1 is loaded in a chamber and a nitrogen ($N_2$) gas is injected into the chamber. The nitrogen ($N_2$) gas reacts with silicon oxide ($SiO_2$) of the first base substrate SUB1. The silicon oxynitride thin layer formed on the first base substrate SUB1 serves as the first compensation layer CL1. According to another embodiment, the silicon oxynitride thin layer may be formed by forming silicon nitride (SiNx) on the first base substrate SUB1 loaded in the chamber and injecting nitrous oxide ($N_2O$) gas into the chamber.

When the concentration of the nitrogen gas and the pressure of the chamber are controlled, the ratio of the amount of the silicon oxynitride may be controlled in the silicon oxynitride thin layer, and thus, the refractive index of the first compensation layer CL1 may be controlled.

The thin film transistor TFT including the gate insulating layer GI is formed on the first compensation layer CL1. The thin film transistor TFT is formed through a deposition, exposure, and development processes. The gate insulating layer GI is formed using silicon nitride.

The passivation layer PS is disposed on the thin film transistor TFT. According to embodiments, the passivation layer PS may be omitted. The passivation layer PS covers the thin film transistor TFT in the light blocking area SA and covers the gate insulating layer GI in the transmitting areas TA. The passivation layer PS may be formed by coating and patterning the organic or inorganic material, or by using a deposition process.

The second compensation layer CL2 is formed on the passivation layer PS. The second compensation layer CL2 can be formed by various methods, such as a depositing method, a sputtering method, etc. For instance, when the passivation layer PS includes silicon nitride, the second compensation layer CL2 may be a silicon oxynitride thin layer that is formed by applying nitrous oxide ($N_2O$) gas to the passivation layer PS. According to another embodiment, the passivation layer PS may include silicon oxide and the silicon oxynitride thin layer may be formed by applying a nitrous oxide ($N_2O$) gas to the passivation layer PS.

In forming the compensation layer CL2, when the concentration of the nitrous oxide gas and the pressure of the chamber are controlled, the ratio of the amount of the silicon oxynitride may be controlled in the second compensation layer CL2, and thus, the refractive index of the second compensation layer CL2 may be controlled.

The organic layer OL is formed on the second compensation layer CL2. The organic layer OL planarizes the surface of the second compensation layer CL2. In addition, when the organic layer OL is formed using an organic material having specified colors, a display panel having a COT (color filter on TFT) structure in which the color filters are disposed on the thin film transistor TFT may be manufactured.

The pixel electrode PE is formed on the organic layer OL. A capping layer may be further formed between the organic layer OL and the pixel electrode PE. The pixel electrode PE includes a transparent conductive oxide or a metal layer with a high transmittance. The pixel electrode PE may be formed by depositing and patterning methods.

In addition, the pixel electrode PE has various thicknesses. For instance, the pixel electrode PE may be formed by using a mask corresponding to the transmitting areas TA and performing a selective patterning process to have a thickness of about 1100 angstroms to about 1300 angstroms. The protective layer is formed on the pixel electrode PE to protect the pixel electrode PE and the alignment layer (not shown) is formed on the pixel electrode PE by using a polymer, e.g., polyimide.

Referring to FIG. 4, the light blocking pattern layer BPL is formed on the second display substrate DS2. The light blocking pattern layer BPL may include the light blocking patterns to cover the thin film transistor TFT and the signal lines. The light blocking pattern layer BPL is formed of a material with a low transmittance. The light blocking pattern layer BPL may include a metal material with a low transmittance or a black resin material. For instance, the light blocking pattern layer BPL may include chromium, a double-layer structure of chromium-chromium oxide materials, carbon pigment, or graphite.

An organic pattern layer having colors may be disposed adjacent to the light blocking patterns of the light blocking pattern layer BPL. The organic pattern layer is formed to overlap the transmitting areas TA. The organic pattern layer includes pigments having colors. The organic pattern layer may represent different colors in every one of the transmitting areas TA.

The second electrode CE is formed on the light blocking pattern layer BPL. The second electrode CE includes a transparent conductive material. The second electrode CE may be formed by depositing or sputtering and patterning the conductive material on the second display substrate DS2. The protective layer formed of an organic or inorganic material and the alignment layer formed of polyimide may be formed on the second electrode CE.

The first display substrate DS1 is disposed above the second display substrate DS2 and coupled to the second display substrate DS2. The first display substrate DS1 and the second display substrate DS2 are coupled to each other by using a coupling member, such as sealant. The liquid crystal layer LCL is formed by injecting liquid crystal between the first and second display substrates DS1 and DS2.

According to at least one embodiment, the compensation layer of the display panel compensates for the difference in refractive index between the insulating layer and the other layer disposed adjacent to the insulating layer. Thus, the reflectance of the display panel can be lowered and a substantially uniform reflective spectrum is realized. In addition, the display quality of the display panel may be improved by adjusting the thickness of the electrodes.

Although the exemplary embodiments of the described technology have been described, it is understood that the present invention should not be limited to these exemplary embodiments but various changes and modifications can be made by one ordinary skilled in the art within the spirit and scope of the described technology as hereinafter claimed.

What is claimed is:

1. A display substrate, comprising:
   a base substrate having a first refractive index and configured to receive external light;
   a first insulating layer disposed below the base substrate and having a second refractive index different from the first refractive index, wherein the first insulating layer has an inherent reflective spectrum;
   a pixel electrode disposed below the first insulating layer; and
   a first compensation layer disposed between the first insulating layer and the base substrate, wherein an interface is defined between the first insulating layer and the first compensation layer,
   wherein the first compensation layer has a third refractive index greater than the first refractive index and less than the second refractive index,
   wherein the interface is configured to reflect a portion of the external light, wherein the light reflected from the interface has a reflective spectrum, and wherein the first compensation layer is configured to modify the inherent reflective spectrum of the first insulating layer to generate the reflective spectrum of the reflected light.

2. The display substrate of claim 1, further comprising a plurality of signal lines disposed between the base substrate and the first insulating layer, wherein the first compensation layer is disposed between the base substrate and the signal lines.

3. The display substrate of claim 1, further comprising a second compensation layer disposed between the first insulating layer and the pixel electrode, wherein the second compensation layer has a refractive index between the refractive indices of neighboring layers thereof.

4. The display substrate of claim 3, further comprising a second insulating layer disposed between the first insulating layer and the pixel electrode and configured to reflect at least a part of the external light at a surface thereof facing the second compensation layer, wherein the refractive index of the second compensation layer is between the refractive index of the second insulating layer and the refractive index of the pixel electrode.

5. The display panel of claim 3, further comprising a second insulating layer is disposed between the second compensation layer and the pixel electrode and configured to reflect at least a part of the external light at a surface thereof facing the second compensation layer, wherein the refractive index of the second compensation layer is between the refractive index of the first insulating layer and the refractive index of the second insulating layer.

6. The display substrate of claim 1, wherein the first insulating layer is formed at least partially of silicon nitride and the first compensation layer is formed at least partially of silicon oxynitride.

7. The display substrate of claim 6, wherein the first compensation layer has a thickness between about 800 angstroms to about 1500 angstroms.

8. The display substrate of claim 7, wherein the pixel electrode has a thickness between about 1100 angstroms to about 1300 angstroms.

9. The display substrate of claim 1, further comprising a common electrode disposed below the pixel electrode, wherein the pixel electrode is configured to receive a first voltage and wherein the common electrode is configured to receive a second voltage different from the first voltage.

10. A display substrate, comprising:
    a base substrate configured to receive external light;
    an insulating layer disposed below the base substrate and having a first refractive index, wherein the insulating layer has an inherent reflective spectrum;
    a pixel electrode disposed below the insulating layer and having a second refractive index; and
    a first compensation layer disposed between the insulating layer and the pixel electrode, wherein an interface is defined between the insulating layer and the first compensation layer,
    wherein the first compensation layer has a third refractive index greater than the first refractive index and less than the second refractive index,
    wherein the interface is configured to reflect a portion of the external light, wherein the light reflected from the interface has a reflective spectrum, and wherein the first compensation layer is configured to modify the inherent reflective spectrum of the insulating layer to generate the reflective spectrum of the reflected light.

11. The display substrate of claim 10, further comprising an organic layer disposed between the pixel electrode and the first compensation layer and configured to reflect at least a part of the external light at a surface thereof facing the first compensation layer, wherein the organic layer has a fourth refractive index greater than the third refractive index.

12. The display substrate of claim 10, wherein the organic layer comprises a color filter layer.

13. A display panel, comprising:
a first display substrate configured to receive external light; and
a second display substrate facing the first display substrate,
wherein the first display substrate comprises:
a first base substrate having a first refractive index and configured to receive the external light;
a first insulating layer disposed below the first base substrate and having a second refractive index different from the first refractive index, wherein the first insulating layer has an inherent reflective spectrum;
a first electrode disposed below the first insulating layer; and
a first compensation layer, wherein an interface is defined between the first insulating layer and the first compensation layer,
wherein the first compensation layer has a third refractive index greater than the first refractive index and less than the second refractive index,
wherein the interface is configured to reflect a portion of the external light, wherein the light reflected from the interface has a reflective spectrum, and wherein the first compensation layer is configured to modify the inherent reflective spectrum of the first insulating layer to generate the reflective spectrum of the reflected light.

14. The display panel of claim 13, wherein the first compensation layer is disposed between the first base substrate and the first insulating layer and wherein the thickness of the first compensation layer is between about 700 Å to about 1100 Å.

15. The display panel of claim 14, further comprising:
a second insulating layer disposed between the first insulating layer and the first electrode; and
a second compensation layer disposed between the first and second insulating layers, wherein the second compensation layer has a refractive index between the refractive index of the first insulating layer and the refractive index of the second insulating layer.

16. The display panel of claim 15, wherein the second insulating layer further comprises an organic layer.

17. The display panel of claim 16, wherein the organic layer comprises a color filter layer.

18. The display panel of claim 17, wherein the first electrode has a thickness between about 1100 Å to about 1300 Å.

19. The display panel of claim 12, wherein the second display substrate comprises:
a second base substrate facing the first base substrate; and
a second electrode disposed over the second base substrate and facing the first electrode, wherein the first and second electrodes are configured to form an electric field therebetween.

20. The display substrate of claim 19, further comprising a liquid crystal layer disposed between the first and second display substrates.

* * * * *